United States Patent [19]

Muhlfelder et al.

[11] 4,071,211

[45] Jan. 31, 1978

[54] MOMENTUM BIASED ACTIVE THREE-AXIS SATELLITE ATTITUDE CONTROL SYSTEM

[75] Inventors: Ludwig Muhlfelder, Livingston; John Edward Keigler, Princeton, both of N.J.; Brian Stewart, Slough, England

[73] Assignee: RCA Corporation, New York, N.Y.

[21] Appl. No.: 724,577

[22] Filed: Sept. 23, 1976

[51] Int. Cl.² ............................................. B64G 1/20
[52] U.S. Cl. ............................. 244/165; 73/178 R; 244/3.21; 244/166; 244/171; 364/434
[58] Field of Search ............ 244/171, 165, 166, 3.20, 244/3.19, 3.21; 73/178 R; 235/150.2

[56] References Cited

U.S. PATENT DOCUMENTS

| | | | |
|---|---|---|---|
| 2,973,162 | 2/1961 | Haeussermann | 244/165 |
| 3,350,033 | 10/1967 | Goldberg | 244/165 |
| 3,591,108 | 7/1971 | Perkel | 244/165 |
| 3,998,409 | 12/1976 | Pistiner | 244/165 |

*Primary Examiner*—Trygve M. Blix
*Assistant Examiner*—Reinhard J. Eisenzopf
*Attorney, Agent, or Firm*—Edward J. Norton; H. Christoffersen; Joseph D. Lazar

[57] ABSTRACT

Control of an active three-axis multiple-wheel attitude control system is provided with a bias momentum to achieve stiffness about the pitch axis. With this stiffness, the system overcomes the inherent inability of a zero momentum system employing the sun as its yaw reference to be provided with this yaw reference during the periods encompassing satellite high noon and midnight (i.e., approximate coalignment of the sun line and the local vertical). The satellite attitude is normally maintained by angular momentum exchange developed by three or more reaction wheels positioned on the satellite. The control mechanism is arranged to provide net angular momentum in the pitch axis wheels to achieve the momentum bias or stiffness along the pitch axis, whereas the time average of the angular momentum about the roll and yaw axes is substantially zero.

16 Claims, 6 Drawing Figures

MOMENTUM BIASED ACTIVE THREE-AXIS SATELLITE ATTITUDE CONTROL SYSTEM

CROSS REFERENCE TO RELATED APPLICATIONS

Of interest are the following copending applications which are assigned to the same assignee as the present application: Ser. No. 560,361, filed Mar. 20, 1975, now Pat. No. 3,999,729, entitled "Backup Wheel for a Three Axis Reaction Wheel Spacecraft," by Ludwig Muhlfelder and Norman Urton Huffmaster, and Ser. No. 557,318, filed Mar. 11,1975, now Pat. No. 3,998,409, entitled "Minimization of Spacecraft Attitude Error Due to Wheel Speed Reversal," by Josef Siegfried Pistiner. Also of interest is application Ser. No. 606,273 filed Aug. 20, 1975, now Pat. No. 4,010,921, by Ludwig Muhlfelder and Josef Siegfried Pistiner, entitled "Spacecraft Closed Loop Three-Axis Momentum Unloading System,"assigned to the United States of America (Air Force).

BACKGROUND OF THE INVENTION

1. Field of the Invention

This invention relates to an active three-axis controlled spacecraft.

2. Description of the Prior Art

Certain earth oriented satellites use a three-axis reaction wheel set for attitude control. Precision attitude control can be achieved by means of control torques developed by three reaction wheels in response to sensor-derived attitude error information. The three reaction wheels are classically mounted in the spacecraft in such a manner that their axes are parallel to an orthogonal set of body axes about which attitude control is to be maintained. For an earth-pointing spacecraft, one of the wheel axes is thus parallel to the spacecraft pitch axis which is nominally parallel to the orbit normal. The other two wheel axes are aligned with the spacecraft roll (velocity vector) and yaw (local vertical) axes, respectively. In the absence of large external disturbance torques, such a spacecraft system is referred to as a substantially zero-momentum system because the time average reaction wheel momentum about each axis is substantially zero.

Certain other earth oriented satellites use a single reaction wheel rotated about an axis oriented along the pitch axis of the spacecraft operating at an average non-zero, or bias, momentum so as to maintain the yaw axis of the main body portion of the spacecraft aligned to the local vertical while the inertial stability of the wheel maintains the pitch axis aligned to the orbit normal. such a satellite control system is a bias momentum controlled satellite and is embodied in the RCA SATCOM I and RCA SATCOM II satellites now in geosynchronous orbit operation, as well as several other satellites now in orbit. A significant feature of the bias momentum system is that the angular position of the body need be measured only about the roll and pitch axes, negating the more complex measurement of yaw.

In the zero momentum type of three axis stabilized attitude control for satellites, an attitude reference for each axis (i.e., roll, pitch, and yaw) is required to maintain the axes in the desired attitude and orientation. Whereas the earth itself (in the case of an earth orbiting satellite) provides a convenient reference for sensing pitch and roll errors as by use of a horizon sensor, other means involving the sun, certain stars, radio beacons and/or gyroscopes must be utilized to derive yaw axis information.

In order to avoid the use of either moving mechanical assemblies with high speed rotors, such as gyros, or of the operational complexities of star sensing, the sun can be selected as a convenient means to determine errors about the yaw axis for the non-eclipsed portion of the orbit. The sun is thus termed a yaw reference. However, in the vicinity of satellite noon or midnight, the sun cannot serve as a yaw reference, since the yaw axis approximately coincides with the sun line, so that decreased yaw sensitivity results. In fact, there can be no yaw signal at the point of coalignment. Operation of a zero momentum system with no yaw error input for these blind periods (eclipses) results in degraded pointing control. It is this defect or shortcoming in a zero momentum three-axis system depending on the sun for a yaw reference that detracts from the full use of a zero momentum system for a high accuracy attitude control where long life and reliability preclude other more complex yaw attitude devices.

SUMMARY OF THE INVENTION

According to the invention, a three-axis stabilized satellite is provided with a momentum bias along the pitch axis. The momentum bias is implemented in one embodiment in a configuration of three-orthogonal reaction wheels aligned parallel to the body roll, pitch, and yaw axes, respectively, operating the pitch wheel with a non-zero average speed, and the roll and yaw operating with an average speed of zero.

In another form of the invention, three or more reaction wheels are arranged in a skewed configuration, the speed of the wheels being controlled such that their long term average vector sum of their momenta along the pitch axis is non-zero, while the corresponding vector sums along the roll and yaw axes is approximately zero. Implementation with four or more wheels provides increased reliability since, with the appropriate control electronics, any three wheels can provide complete control.

For either form, the inertial gyroscopic stability of the resultant pitch momentum provides memory which will maintain nominal yaw attitude during the periods of no, or insensitive, sun derived yaw error, to thereby minimize the effect of disturbance torques. The need of yaw sensing, during the blind periods caused by the undesirable alignment of the satellite, the earth, and the sun is obviated, while the precision of yaw control provided by the pitch momentum is improved compared to operating a zero momentum system open loop (i.e., no yaw error) during these periods.

DETAILED DESCRIPTION OF THE PREFERRED EMBODIMENTS

Figure 1:
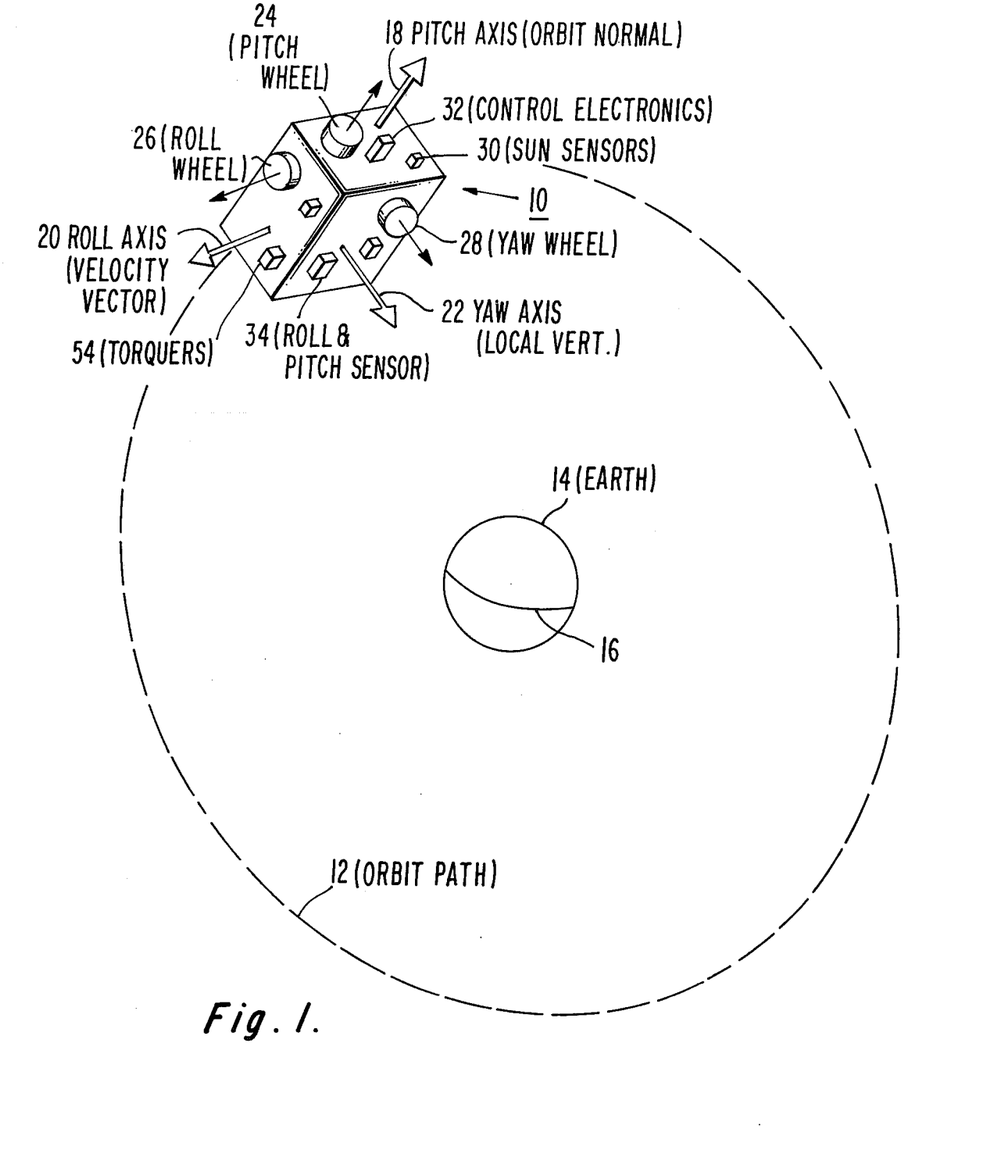
FIG. 1 is a schematic of one form of the invention in a satellite in orbit.
Figure 2:
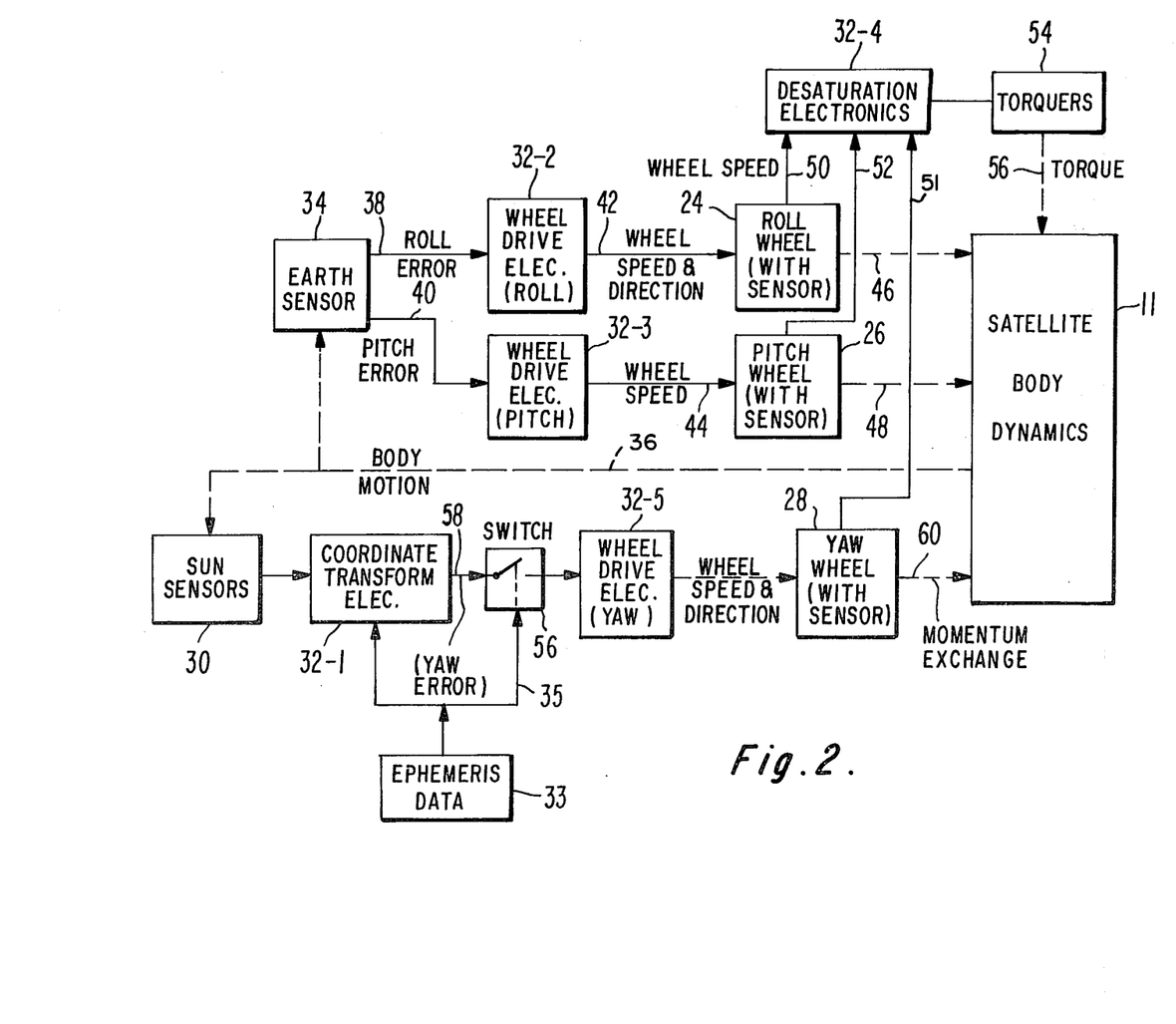
FIG. 2 is a block diagram of the attitude control system for the satellite illustrated in FIG. 1.
Figure 3:
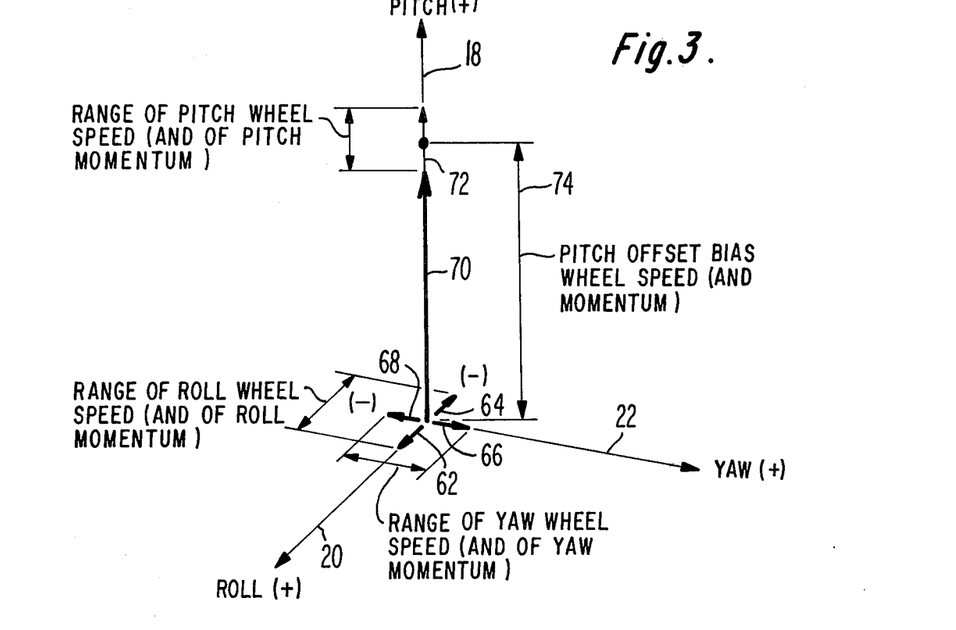
FIG. 3 is a vector diagram of the wheel velocities and angular momenta of the satellite illustrated in FIG. 1.

(ORTHOGONAL ARRAY OF REACTION WHEELS — FIGURES 1,2,3)

Referring now to FIG. 1, there is shown a schematic diagram of a spacecraft 10 in an orbit 12 about a central body such as the earth 14. The spacecraft may be in a geosynchronous orbit in the extension of the equatorial plane 16 of the earth. The invention may be utilized in satellites operating in any orbit. In a geosynchronous orbit, a satellite appears to hover over a fixed point on the earth's surface on the equator 16. The principal body axes of the spacecraft using conventional references include the pitch axis 18, the roll axis 20, and the yaw axis 22, each of said axes emanating from the center of mass of spacecraft 10 in orthogonal relationship to each other. The yaw axis is nominally oriented to point to the earth's surface and as such is termed the local vertical. The pitch axis is nominally oriented normal to the orbit plane 12 while the roll axis is nominally oriented parallel to the velocity vector when the orbit is circular.

Three reaction wheels, namely: a pitch wheel 24, a roll wheel 26, and a yaw wheel 28 are mounted on the spacecraft in such a manner that their respective axes are parallel to the corresponding orthogonal set of body axes 18, 20, and 22. for redundancy requirements each wheel can be replaced by a plurality of wheels as known in the art. In addition, the spacecraft includes two or more sun sensors 30, control electronics 32, and roll and pitch sensors 34.

Referring now to the block diagram of the attitude control system illustrated in FIG. 2, the organization and arrangement of the various components of the spacecraft are shown. The body dynamics of the spacecraft 10 are represented by the block 11. Movement of spacecraft 10 from a desired reference is manifested as deviations in body motion (path 36) causing the sun sensors 30 to generate sun sensor error signals, relative to the desired reference, which are coupled to coordinate transform electronics 32-1. Deviations of such satellite body motion are also sensed by earth sensor 34 to generate thereby signals representing roll error and pitch error which signals are coupled to wheel drive electronics 32-2 for roll errors and 32-3 for pitch errors via signal paths 38 and 40, respectively.

The wheel drive electronics 32-2 for roll error signals provide control signals to control the speed and direction of roll wheel 24. The wheel drive electronics 32-3 for pitch error signals provide control signals to control only the speed of pitch wheel 26 since the direction of the pitch wheel never changes in this mode of operation. These control signals are respectively conducted over signal paths 42 and 44. The momentum exchange effects of the rotation of the roll wheel 24, pitch wheel 26, and yaw wheel 28 on the satellite is represented by the satellite dynamics 11 responding to such effects via paths 46 and 48.

The sun sensors 30 provide an error in sun angle deviation caused by disturbed motion of the spacecraft to control the speed and direction of yaw wheel 28. This yaw wheel control is achieved by wheel drive electronics 32-5 responding to signals from the coordinate transform electronics 32-1 when switch 56 (shown in an open condition) is closed. Suitable signals representing ephemeris data relating to the position of the sun relative to the earth are provided to the system via coordinate transform electronics 32-1. A signal generated by the data 33 operates and controls switch 56.

Switch 56 is opened at proper points in orbit (as by way of the "control" line 35 from ephemeris data or memory) to remove the sun sensor (30) derived signal from the yaw wheel control when the sun line and local vertical (i.e., yaw axis) approach coalignment (near satellite high noon and midnight). During this time of no yaw error input, gyroscopic stiffness of the pitch axis due to bias pitch momentum, maintains yaw pointing control. Thus when switch 56 is opened, yaw wheel speed is either held constant to the speed present at time of opening, or varied in a prescribed a priori schedule to effect some desired body yaw rate.

The ephemeris data may be suitably stored in a ROM on the satellite, or in the alternative, such data can be received from a ground control source. The yaw error manifested by signals from the sun sensors 30 are coupled over control path 58 and processed by wheel drive electronics 32-5 which, in turn, provides signals to control the speed and direction of yaw wheel 28. The momentum effects of yaw wheel 28 are reflected in the satellite dynamics 11 via path 60.

The operating conditions of wheels 24, 26, and 28 are provided as an input to desaturation electronics 32-4 via signal paths 50, 51 and 52. It should be noted that suitable speed and direction sensors are incorporated for convenience with each wheel to provide appropriate wheel condition signals. Desaturation electronics 32-4 generate suitable signals for energizing torquers 54 for developing control torques (torque path 56) to reduce the deviations of the respective wheel speeds from their desired references. Torquers 54 are preferably thrusters suitably positioned on a spacecraft in a manner known in the art to effect the desired external body torques about each of the three control axes.

Torquers 54, shown for convenience as a single block in the drawing, are suitably distributed and oriented on the satellite to generate thrusts or jet gases to achieve the desired torquing effect. If desired, the required torques may be achieved using magnetic torquers suitably positioned on the satellite as known in the art to react when energized with the magnetic field of the earth. One example of such magnetic torquing is described in the aforementioned copending application Ser. No. 606,273.

The electronic subsystems 32 (blocks 32-1, 32-2, etc.) for operating the wheels and the desaturation torquers are implemented by conventional circuits in accordance with design techniques well known in the art. A detailed description of typical control circuits for three axis control systems are described in the above copending applications, Ser. No. 557,318, of J. S. Pistiner and Ser. No. 560,361 of L. Muhlfelder and N. U. Huffmaster.

In brief in a conventional three-axis zero momentum system, spacecraft 10 is maintained in the desired orientation and attitude indicated in FIG. 1 by the roll, pitch, and yaw wheels being operated to a time average of zero angular momentum in response to error control signals provided by the earth sensors 34 and the sun sensors 30. However, during the periods the sun and the earth are in alignment with the local vertical of the satellite, the sun sensor is insensitive to yaw attitude errors, and thereby the sun sensor in such conventional systems cannot provide control signals to control the yaw wheel 28 with reliable accuracy.

According to the present invention, the satellite is provided with a residual angular momentum along the pitch axis throughout the orbit period. The residual angular momentum provides the spacecraft with a momentum stiffness that biases the satellite in a controlled and desired orientation without dependence upon the stabilization operation of the three reaction wheels in the time-averaged zero momentum mode. The principle of gyroscopic stiffness is well known and has been implemented in prior art satellites such as the RCA SATCOM I and II satellites mentioned above. However, a prior art biased momentum satellite requires that the angular momentum be sufficiently large that no yaw measurement is required at any time, yaw control being effected by the well-known quarter-orbit interchange of yaw and roll, such that continuous control of roll produces effective control of yaw due to the gyroscopic stiffness of the pitch axis. According to the present invention, the magnitude of pitch momentum can be much less, since the gyroscopic stiffness is utilized for a shorter time; namely, the duration of the noon and midnight periods of near coalignment of the sun line and local vertical. For example, in a satellite such as the RCA SATCOM class, the angular momentum along the pitch axis required to maintain the satellite stabilized is in the order of 150 inch-pound-seconds (in-1b-sec). In another class of satellites known as the ITOS NOAA satellites owned and operated by NASA, the bias momentum is in the order of 210 in-1b-secs. According to the present invention, the residual momentum bias is typically in the order of about 15 in-1b-secs. The magnitude of the bias momentum provided by the pitch wheel 35 depends on the accuracy of the yaw control that is desired and also on the time the yaw control loop will be in its "opened" (by switch 56) condition.

In order to implement the invention, therefore, to operate and control the system to provide a residual momentum, the pitch wheel is operated in cooperation with the roll and yaw wheels to establish not only the angular momentum required for the conventional operation of the three-axis, time-averaged zero angular momentum mode of operation, but also, in addition, the pitch wheel is controlled to provide a continuous residual angular momentum to the satellite. Specifically, the pitch wheel continuously operates with a bias momentum such that during the periods when the sun sensor receives no usable sun signals and is therefore inoperative, the gyroscopic stiffness provides yaw control. These conditions of yaw insensitivity occur during satellite noon and midnight. During these periods, switch 56 is arranged to be open in response to a data signal from block 33 as shown in FIG. 2.

Before proceeding with a detailed description of the operation of the system, reference is made to FIG. 3 which is a diagram illustrating the relationship of the speed and momentum vectors affected by the system in operation. The vectors 62 and 64 represent, respectively the range of the speed (or equivalently the momentum) of the roll wheel during the various portions of orbit of the satellite. The sign sense of vector 62 is positive corresponding to the positive sense of roll axis 20. One direction of rotation of roll wheel 26 determines the momentum vector in that direction sense, the magnitude of the momentum being related to the speed of the wheel. Vector 64 similarly represents the momentum resulting from the roll wheel 26 rotating in the opposite direction. The direction of rotation of the roll wheel 26 is reversed in a manner known in the art as required by the result of the total external body torques. The speed (and equivalently the momentum) of yaw wheel 28 is represented by vectors 66 and 68 in a similar manner. The pitch wheel 24 provides the residual momentum of the system. It rotates continuously in the same direction throughout the orbit since it is always normal to the plane of the orbit. The speed (and thus a momentum) of pitch wheel 24 is represented by vectors 70 and 72. The operating range of the pitch wheel is represented by the difference between the vectors 70 and 72, which difference varies in magnitude in accordance with changes in the external body torques about the pitch axis. The average value of the momentum of pitch wheel is represented by the dimension 74. Vector 74 is termed herein the pitch offset bias wheel speed (or momentum).

As indicated above, the conventional active three-axis attitude control system, stability of the spacecraft is maintained by controlling the wheels of the respective pitch, roll, and yaw axes to a time average of zero on a long term, average basis. Each wheel goes through speed and reversed directions of rotation during the orbit period, resulting in a nominal average momentum for the system near or at zero. If wheel momentum in excess of a predetermined threshold value develops, the change will be sensed by the wheel rate sensors (24, 26, 28) to cause a desaturation ("dumping") of the momentum by torquers 54 such as thrusters or magnetic dipoles, which impart an external body torque, thus changing the total system momentum. In the vicinity of local (satellite) noon or midnight, the sun sensors are insensitive to yaw error and thus cannot provide valid signals in the yaw wheel control loop. According to this invention, as previously indicated, this problem is solved by providing a momentum bias along the pitch axis of sufficient magnitude that the momentum of the pitch axis and thus of the satellite is not zero on a long term average, and, further, is of such a value as to provide momentum stiffness of the spacecraft. During this same period, the roll wheel continues to operate in a conventional manner of a zero momentum system, while the pitch wheel continues to operate in a conventional manner of a bias momentum system. The yaw wheel is controlled in an "open" loop condition to operate at a fixed or predetermined speed during the period switch 56 is open. While switch 56 is closed, the sun sensors 30 provide the control signals for the "closed" loop for the yaw wheel. The inertial stability of the net pitch angular momentum (vectors 70 and 72, FIG. 3) which is oriented approximately parallel to the orbit normal, that is along the axis parallel to axis 18 (FIG. 1), imparts to the satellite 10, the desirable independence of yaw sensing of the conventional momentum bias, three-axis control system while the variable transverse roll and yaw wheels (26 and 28) impart the control flexibility of a zero momentum system. Although no yaw attitude information is available during the local noon and local midnight periods of the orbit, the gyroscopic memory provided by the added pitch bias momentum maintains nominal yaw attitude and minimizes the effect of external disturbances.

The magnitude of the required pitch momentum bias is a function of the duration of the "open loop" (switch 56 opened) yaw period (that is, during the period of the orbit during which the sun yaw sensor is inoperative)

and of the external disturbances and of the allowable yaw error of the system.

OPERATION OF THE ORTHOGONALLY RELATED WHEEL CONFIGURATION (FIGS. 1, 2, AND 3)

In normal operation with switch 56 in a closed position, spacecraft 10 is maintained in the desired orientation by which the yaw axis 22 is coincident with the local vertical pointing to the earth. The earth sensor 34 operates to provide any roll or pitch errors manifested by deviations of the spacecraft from this desired orientation. Such error signals cause the wheel drive electronics (32-2, 32-3) to provide signals to effect changes in the speed of the respective roll and pitch wheels 24 and 26 and, as required, the direction of rotation of the roll wheel 24. As the roll and yaw wheels must be controlled to effect an average zero or near average zero momenta for the long term average, it is required that the spacecraft system desaturate the momentum that may have accumulated as required to maintain this near zero average, and also, to provide desaturation control for the pitch wheel to maintain an average bias momentum.

The momentum is controlled in accordance with suitable logic to generate signals based upon the calculations performed by wheel drive electronics 32-2, 32-3 and 32-5 and the desaturation electronics 32-4 in response to the reference signals from sensors 30 and 34. The momenta of the respective axes are changed in accordance with a suitable control law as known in the art. A detailed set of control laws for the preferred embodiment (FIG. 4) to be described, are set forth in Tables I and II below.

Accordingly the desaturation electronics 32-4 is arranged to respond to the respective roll wheel speeds (24 and 26) such that in response to threshold values exceeding the critical value a suitable signal will be generated to actuate torquers 54. Torquers 54 when energized will generate suitable torques to effect a reduction in the momentum of the spacecraft manifested by changes in speed of the respective wheels.

Concurrently with switch 56 closed the yaw wheel 22 is controlled to its required speed and direction to maintain a long term average of zero or near zero momentum. The yaw wheel is controlled in response to signals derived from the sun sensors 30 which generate yaw error signals as they occur which are processed by the coordinate transform electronics 32-1 to provide control signals to the wheel drive electronics 32-5, which in turn, generates the operating signals for controlling the speed and direction of the yaw wheel 28.

During the periods of yaw insensitivity with respect to the sun occurring near spacecraft noon and midnight periods, the switch 56 is opened as shown in FIG. 2. Ephemeris data signals then control the speed of wheel 28 according to a predetermined schedule, maintaining thereby satellite stability independently of sun sensor signals. When switch 56 is subsequently closed, the yaw wheel 28 will again be responsive to signals from the sun sensors 30.

Figure 4:
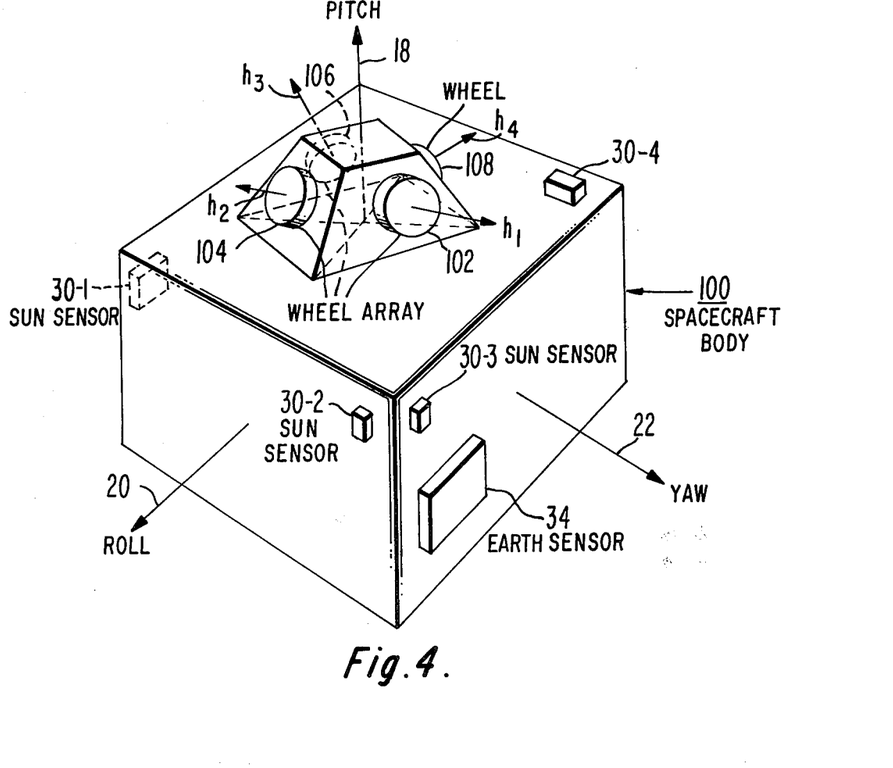
FIG. 4 is a schematic diagram of a preferred form of a spacecraft according to the present invention wherein the wheels are arranged not along the principal body axes but rather with the vector sum of the momenta along the principal body axes.
Figure 5:
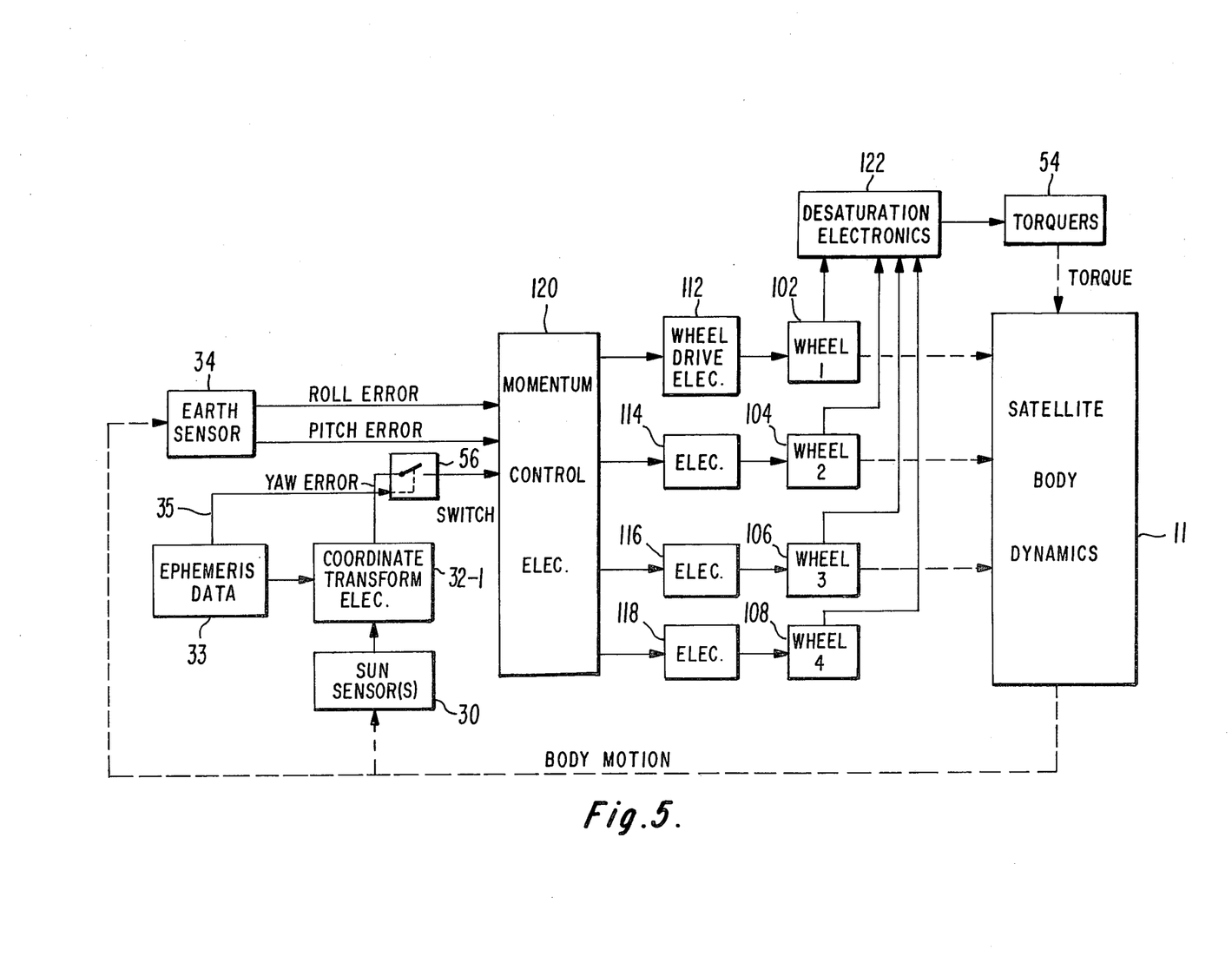
FIG. 5 is a block diagram of the attitude control system for the satellite illustrated in FIG. 4.
Figure 6:
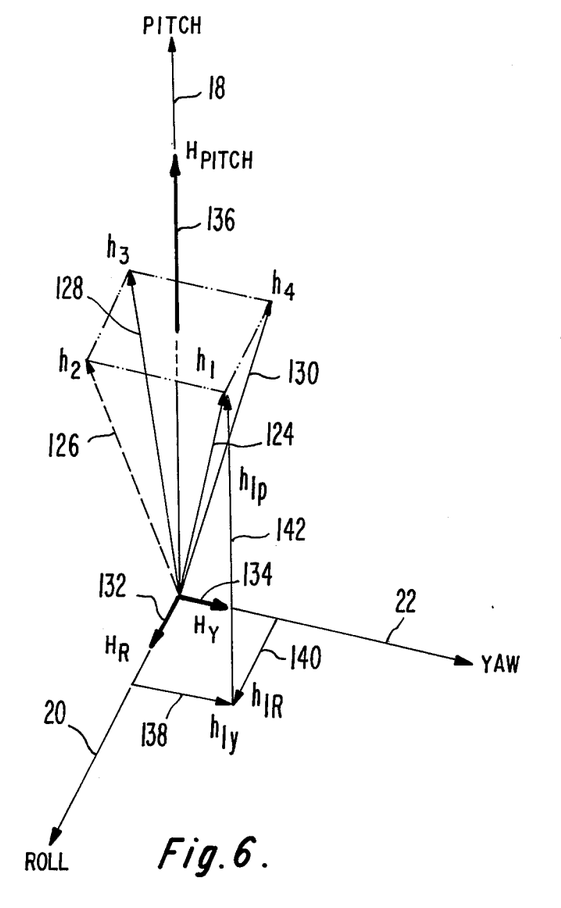
FIG. 6 is a vector diagram of the skewed wheel momenta resulting in the vector sum along the principal axes for the satellite illustrated in FIG. 4.

(SKEWED ARRAY OF REACTION WHEELS FIGS. 4, 5, AND 6)

The orthogonal array of wheels as illustrated in FIG. 1 is operative as explained above to provide the residual momentum along the pitch axis to achieve gyroscopic stiffness of the satellite. A preferred arrangement of reaction wheels (FIG. 4) comprises three or more such wheels arranged in skewed fashion relative to the principal body axes. The reason that the skewed array is preferred is that redundancy is achieved, since, for example, in the four wheel system now to be described, full control in accordance with the residual momentum principle described heretofore is achieved with operation of any three of the four wheels. Hence reliability of the spacecraft control system is enhanced for its long, unattended life in orbit. A second feature, and practical advantage, of the four wheel system described is that none of the wheels is required to reverse its direction or operate in the critical near-zero speed region, but all three operating wheels maintain a long term average bias speed, while the vector sum of their angular momenta follow the control laws and teachings of this invention.

In FIG. 4, the spacecraft body 100 is provided with four wheels 102, 104, 106, and 108 mounted on a pyramid structure 110. The spacecraft body is also provided to include an earth sensor 34, an array of sun sensors 30-1, 30-2, 30-3, and 30-4, collectively designated 30. The quantity and location of sun sensors is determined, in part, by the field of sun view that is available to the sensor during the orbit. The respective pitch, roll, and yaw axes are designated similarly to the axes in FIG. 1 by the reference numerals 18, 20, and 22.

The organization and arrangement of the various components for the skewed wheel system as arranged in accordance with FIG. 4, is shown in the block diagram of FIG. 5. The spacecraft dynamics 11 are influenced by the four wheels 102-108, which, in turn, are controlled by wheel drive electronics 112, 114, 116, and 118, respectively. Momentum electronics 120 provides the required signals for controlling the wheels in response to roll and pitch errors generated by earth sensor 34 and yaw errors generated by the sun sensors 30, the error signals of which are processed by the coordinate transform electronics 32-1 via switch 56. Ephemeris is provided from the suitable data source 33 such as in the form of a ROM memory. Desaturation electronics 32-4 responding to signals representing the wheel speeds of the respective four wheels generates control signals for torquers 54 to desaturate the several operating wheels by generating appropriate external torques on the spacecraft 100.

The momentum vectors for the skewed wheel configuration are illustrated in FIG. 6. The vectors representing the momentum of the respective four wheels ($h_1$, $h_2$, $h_3$, and $h_4$) are represented respectively by vectors 124, 126, 128, and 130. The vector sum of these four vectors are represented by the vectors 132, 134, and 136 correspondingly respectively to the resultant momenta along the roll axis $H_R$, along the yaw axis $H_Y$, and along the pitch axis $H_{PITCH}$. The resolution of the vector 124 into its three components along the respective control axes is shown by the vectors 138, 140, and 142. This resolution of the vector 124 is typical for the other three wheels and will not be shown for them.

The control laws for effecting the required changes in angular momentum of each of the four wheels are shown in the following Table I.

TABLE I

VECTOR COMBINATION OF ANGULAR MOMENTA FOR TYPICAL SKEWED WHEEL IMPLEMENTATION (FIG. 4)

| Control Axis | OPERATING WHEELS | | | |
|---|---|---|---|---|
| | 1, 2, 3 | 1, 2, 4 | 1, 3, 4 | 2, 3, 4 |
| Pitch | $H_P =$ $h_{1P}+h_{2P}+h_{3P}$ | $H_P =$ $h_{1P}+h_{2P}+h_{4P}$ | $H_P =$ $h_{1P}+h_{3P}+h_{4P}$ | $H_P =$ $h_{2P}+h_{3P}+h_{4P}$ |
| Roll | $H_R =$ $h_{1R}+h_{2R}-h_{3R}$ | $H_R =$ $h_{1R}+h_{2R}-h_{4R}$ | $H_R =$ $h_{1R}-h_{3R}-h_{4R}$ | $H_R =$ $h_{2R}-h_{3R}-h_{4R}$ |
| Yaw | $H_Y =$ $h_{1Y}-h_{2Y}-h_{3Y}$ | $H_Y =$ $h_{1Y}-h_{2Y}+h_{4Y}$ | $H_Y =$ $h_{1Y}-h_{3Y}+h_{4Y}$ | $H_Y =$ $-h_{2Y}-h_{3Y}+h_{4Y}$ |

Where, for example, $h_{1P}$ equals the component of angular momentum of wheel No. 1 (wheel 102, FIG. 4) along the pitch axis 18. Table I illustrates the contribution each set of three provides to the satellite, and, covers, it will be noted, the four possible combinations of three wheel sets. Any one, and only one, of the four skewed wheels serves as a normally inoperative backup wheel to be placed in operative condition if one of the operating wheels is rendered inoperative. The control laws more specifically call for controlling the momentum along each of the principal axes of the satellites as illustrated by the equations tabulated in Table II following. Table II outlines the equations for the skewed wheel system of FIG. 4 wherein wheels 1, 2, and 3 are operating and wheel 4 is in a standby, inoperative condition. Similar equations will be readily apparent for the other combination of three wheel sets.

TABLE II

MOMENTUM CONTROL EXAMPLE (USING WHEELS 1, 2, 3 of FIG. 4)

a) To change $H_P$ to a value $H_{P'}$ only, change angular momentum of wheels 1 and 3 by the same amount along each axis.

$H_{P'} = (h_{1P} + \Delta h_{1P}) + h_{2P} + (h_3 + \Delta h_{1P}) = H_P + \Delta H$
where $\Delta H = 2\Delta h_P$ $H_{R'} = (h_{1R} + \Delta h_{1R}) + h_{2R} - (h_{3R} + \Delta h_{3R}) = H_R$
since $\Delta h_{1R} = \Delta h_{3R}$ $H_{Y'} = (h_{1Y} + \Delta h_{1Y}) - h_{2Y} - (h_{3Y} + \Delta h_{3Y}) = H_Y$
since $\Delta h_{1Y} = \Delta h_{3Y}$ b) To change $H_R$ only, change angular momentum of wheels 2 and 3 by equal and opposite amounts along each axis.

$H_{P'} = h_{1P} + (h_{2P} + \Delta h_{2P}) + (h_{3P} - \Delta h_{3P}) = H_P$
since $\Delta h_{2P} = \Delta h_{3P}$ $H_{R'} = h_{1R} + (h_{2R} + \Delta h_{2R}) - (h_{3R} - \Delta h_{3R}) = H_R + \Delta H$
where $\Delta H_R = 2\Delta h_R$ $H_{Y'} = h_{1Y} - (h_{2Y} + \Delta h_{2Y}) - (h_{3Y} - \Delta h_{3Y}) = H_Y$
since $\Delta h_{2Y} = \Delta h_{3Y}$ c) To change $H_Y$ only, change angular momentum of wheels 1 and 2 by equal and opposite amounts along each axis.

$H_{P'} = (h_{1P} + \Delta h_{1P}) + (h_{2P} - \Delta h_{2P}) + h_{3P} = H_P$
since $\Delta h_{1P} = \Delta h_{2P}$ $H_{R'} = (h_{1R} + \Delta h_{1R}) + (h_{2R} - \Delta h_{2R}) - h_{3R} = H_R$
since $\Delta h_{1R} = \Delta h_{2R}$ $H_{Y'} = (h_{1Y} + \Delta h_{1Y}) - (h_{2Y} - \Delta h_{2Y}) - h_{3Y} = H_Y + \Delta H$
where $\Delta H = 2\Delta h_Y$ In the equations of Table II the primed parameters, for example, $H_{P'}$, are used for convenience to indicate the momentum along the principal axis that is to be affected by the desired change. Nevertheless, it will be noted that only the momentum desired to be changed has a value that is changed, the momenta of the other two axes remaining unchanged at the end of the momentum change operation.

The momentum control electronics 120 (FIG. 5) is arranged to make the computations, in response to signals from the earth and sun sensors, required to change the speed of each of the operating wheels in accordance with the control law of Table I in a manner similar to that for the three-wheel orthogonal array described above. Thus, in normal operation with switch 56 closed, the system will operate to provide substantially zero momentum about the roll and yaw axes a net residual angular momentum along the pitch axis (vector 136, FIG. 6), with the yaw momentum controlled by the sun derived yaw error signal. During the period of local noon and midnight, the eclipse period, switch 56 is opened in response to a data signal via path 35 and yaw momentum is then controlled by a predetermined schedule based on data 33. The residual momentum along the pitch axis provides the momentum bias to maintain the satellite in the desired orientation without losing stability due to either internal or external torques to the satellite.

The earth sensor 34 providing roll and pitch error signals for the system may be any of the well-known devices such as a horizon sensor, one or more accelerometers, or receivers of single or multiple phase radio beacon signals transmitted from the earth.

Reference is made to an article presented at the AIAA/CASI 6th Communications Satellite Systems Conference, Montreal, Quebec, Canada, Apr. 5-8, 1976, entitled "A New Concept for Control of Communication Satellite Using Residual Pitch Momentum (RPM)" by S. G. Hummel, D. F. Reid, and E. L. Tesch, published by the American Institute of Aeronautics and Astronautics as AIAA Paper No. 76-263. This article describes the principle of the present invention.

What is claimed is:

1. An attitude control system for a satellite having a pitch, roll, and yaw axis, each axis, being mutually perpendicular to the other axes comprising:
   a. three or more reaction wheels mounted on respective axes in fixed angular relation to said three perpendicular axes,
   b. attitude sensing means for determining the angular deviation of the satellite from a predetermined reference attitude, said sensing means including a sensor for generating attitude error signals relative to the earth, said sensing means further including at least two sun sensors for generating attitude error signals relative to the sun,
   c. means for providing data signals corresponding to orbit ephemeris,
   d. means responsive to said sun attitude error signals and said ephemeris data signals for computing attitude errors of said yaw axis relative to the sun,
   e. control means responsive to said earth attitude error signals and said sun attitude error signals for controlling the angular velocity of said wheels such that the respective attitude errors signals converge to zero,
   f. control means responsive to the angular velocity of each of said wheels for controlling the velocity of said wheels such that the long time-average momentum along said roll and yaw axes is essentially zero, and a residual momentum bias is generated along said pitch axis to provide gyroscopic stiffness to said satellite.

2. A system according to claim 1 including torquing means wherein said velocity control means includes desaturation means responsive to the speed of said wheels for energizing said torquing means to exert external torques on said satellite such that the velocity of said wheels is maintained within predetermined ranges of velocity.

3. A system according to claim 2 wherein said torquing means comprise thrusters.

4. A system according to claim 2 wherein said torquing means comprise magnetic torquers.

5. A system according to claim 1 wherein said yaw attitude error computing means includes switch means for rendering said computer means inoperative during portions of an orbit of said satellite wherein the angle between the sun line and said yaw axis is less than a prescribed threshold, and, further, wherein said control means includes means for controlling the velocity of said wheels such that the momentum along said yaw axis is controlled to a predetermined schedule.

6. A system according to claim 1 wherein said earth sensing means is a horizon sensor.

7. A system according to claim 1 wherein said attitude sensing means comprises one or more accelerometers.

8. A system according to claim 1 wherein said earth sensing means comprises a receiver of radio beacon signals transmitted from the earth.

9. A system according to claim 1 wherein three reaction wheels only are mounted in mutually orthogonal relation and aligned respective to said roll, pitch, and yaw axes, the velocity of said yaw wheel being controlled in response to said sun sensor signals and the velocity of said roll and pitch wheels being conrolled in response to said earth sensor signals.

10. A system according to claim 1 wherein four wheels only of said reaction wheels are mounted in skewed relation to said roll, yaw, and pitch axes, the respective velocities of each of said wheels being controlled such that the long time average vectorial sum of the angular momenta along said roll and yaw axes is essentially zero, and the long time average vector sum of the angular momentum along the pitch axis is offset by a predetermined bias momentum magnitude, the individual wheel speeds being so-controlled that no wheel either reverses direction or operates near zero speed but rather operates at an average bias speed.

11. A system according to claim 10 including torquing means wherein said control means includes desaturation means responsive to the speed of said wheels for energizing said torquing means to exert external torques on said satellite such that the velocity of said wheels is maintained within predetermined ranges of velocity.

12. A system according to claim 1 wherein one or more of said wheels is normally inoperative, further including means for rendering operative said normally inoperative wheel when any one of said remaining wheels is rendered inoperative.

13. A method for controlling the attitude of an orbiting satellite, said satellite having pitch, roll, and yaw body axes, and three or more reaction wheels mounted on respective axes in fixed angular relation to said body axes, comprising the steps of:
   a. sensing errors in deviation of said satellite from a reference attitude relative to the earth and the sun,
   b. controlling the velocity of said wheels in response to said attitude errors such that the long time average vectorial sum of the angular momenta along the roll and yaw axes is essentially zero and the long time average vector sum of the angular momentum along said pitch axis is offset by a predetermined bias magnitude.

14. The method according to claim 13 further including the step of:
   desaturating the respective momentum of each of said wheels such that the velocity of said wheels is maintained within predetermined ranges of velocity.

15. The method according to claim 14 further including the step of:
   modifying the velocity of said wheels when the angle between the sun line and said yaw axis is less than a predetermined amount such that the momentum along said yaw axis is controlled to a predetermined schedule.

16. The method according to claim 13 wherein one or more of said wheels is normally inoperative, further including the step of:
   rendering operative said normally inoperative wheel when one of the remaining wheels is rendered inoperative.

* * * * *